United States Patent [19]

Fiala

[11] 4,416,360
[45] Nov. 22, 1983

[54] DRIVE FOR AUTOMOBILE AUTOMATIC TRANSMISSION

[75] Inventor: Ernst Fiala, Wolfsburg, Fed. Rep. of Germany

[73] Assignee: Volkswagenwerk Aktiengesellschaft, Wolfsburg, Fed. Rep. of Germany

[21] Appl. No.: 191,079

[22] Filed: Sep. 26, 1980

[30] Foreign Application Priority Data

Oct. 27, 1979 [DE] Fed. Rep. of Germany ....... 2943563

[51] Int. Cl.³ .......................................... B60K 41/02
[52] U.S. Cl. .............................. 192/0.076; 192/0.033; 192/0.09; 192/103 R; 74/572; 180/165
[58] Field of Search ............ 192/0.02 R, 0.033, 0.076, 192/0.09, 0.092, 0.096, 0.098, 103 R, 3.58; 74/572, 661, 847, 752 D, 665 A, 866; 290/4 R, 9, 45; 180/165

[56] References Cited

U.S. PATENT DOCUMENTS

| 3,205,965 | 9/1965 | Roth | 290/9 X |
|---|---|---|---|
| 3,477,013 | 11/1969 | Smith | 74/665 A |
| 3,493,066 | 2/1970 | Dooley | 180/165 |
| 3,941,012 | 3/1976 | Mayer | 74/661 |
| 4,131,171 | 12/1978 | Keyes | 192/0.033 X |
| 4,142,488 | 3/1979 | Steinecke | 192/0.033 X |
| 4,226,295 | 10/1980 | Rembold et al. | 74/866 X |
| 4,259,930 | 4/1981 | Hofbauer | 192/0.033 X |
| 4,262,783 | 4/1981 | Scarrott et al. | 74/866 X |
| 4,282,947 | 8/1981 | Kemper | 74/572 X |

FOREIGN PATENT DOCUMENTS

| 2133485 | 1/1973 | Fed. Rep. of Germany . |
| 2400760 | 9/1975 | Fed. Rep. of Germany . |
| 222098 | 6/1942 | Switzerland . |
| 393311 | 5/1933 | United Kingdom . |

Primary Examiner—George H. Krizmanich
Attorney, Agent, or Firm—Brumbaugh, Graves, Donohue & Raymond

[57] ABSTRACT

A drive train for an automobile engine and automatic transmission includes a clutch positioned between the engine and the flywheel and a starting motor on the transmission side of the clutch.

10 Claims, 2 Drawing Figures

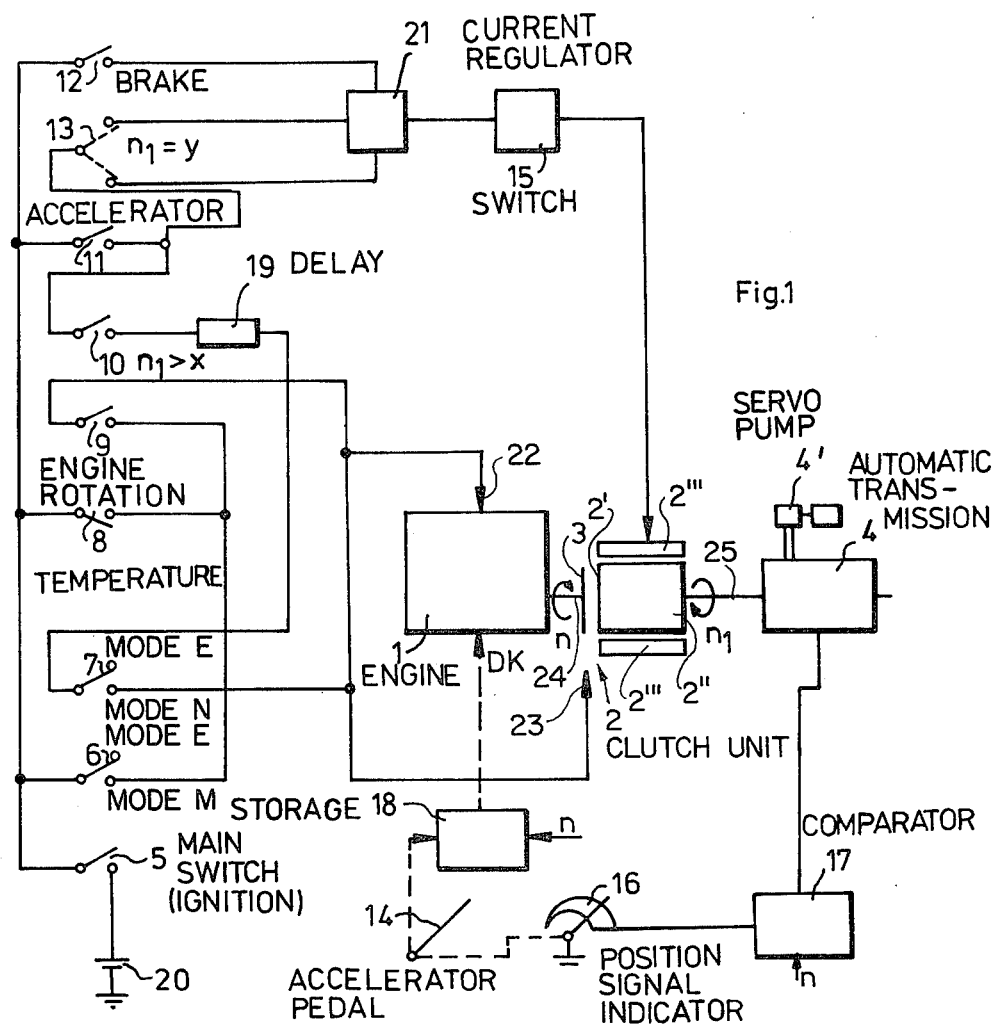
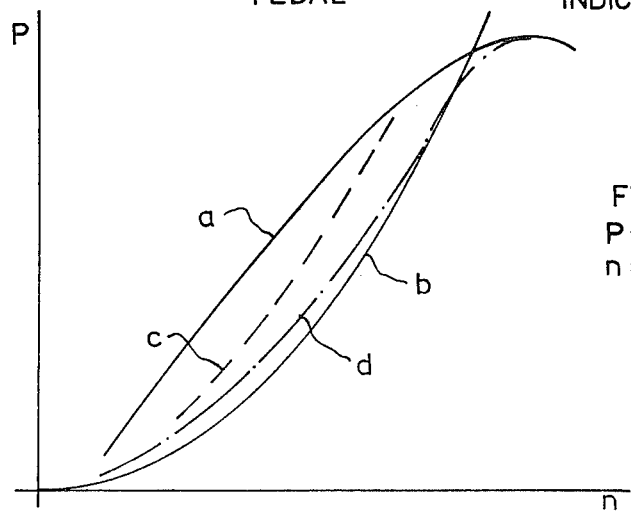
Fig.2
P = POWER
n = SPEED

DRIVE FOR AUTOMOBILE AUTOMATIC TRANSMISSION

BACKGROUND OF THE INVENTION

This invention relates to drive trains for automobiles, and in particular to automobiles having automatic transmissions.

This invention also relates to vehicles having an internal combustion engine and auxiliary electric pneumatic or hydraulic engine drives. Such prior hybrid drive arrangements are disclosed in British Pat. No. 393,311, Swiss Pat. No. 222,098, and German Patent disclosure No. 2,133,485.

While it has been known in the prior art to make use of a hybrid arrangement of electric motor and internal combustion engine drive for a motor vehicle, none of the prior art hybrid drive arrangements suggest the use of this type of hybrid drive to eliminate the requirement for a torque converter in an automatic transmission, thereby providing a drive train arrangement which is highly efficient in fuel consumption.

According to the invention there is provided a drive train system which includes an internal combustion engine having a crankshaft which is connectable to a flywheel by a mechanically operated clutch. The flywheel is connected to the input of an automatic transmission, without the interposition of a hydrodynamic torque converter, which is usually provided. A starting motor, which is also known as a drive-up motor, preferably an electric motor, is provided for turning the flywheel. The vehicle is operated by making use of the starting motor to initially drive the vehicle, through the flywheel and the automatic transmission until a preselected rotational flywheel speed, or vehicle speed, is achieved. At this point the mechanical clutch is closed thereby connecting the flywheel to the crankshaft of the internal combustion engine, rapidly starting the internal combustion engine and thereafter the internal combustion engine can provide the principal portion of the power required for moving the vehicle. At this point, when power is being provided by the internal combustion engine, the vehicle starting motor can serve as a generator for use in recharging the vehicle battery. Thus the present invention goes beyond the mere use of both electrical and internal combustion engines for alternately propelling a motor vehicle, but makes use of this combination for the purpose of eliminating the hydro-dynamic torque converter usually used with an automatic transmission, and thereby improving the overall efficiency of operation of the vehicle.

It is a further feature of the invention that the flywheel is located on the side of the mechanical clutch which is away from the crankshaft of the engine. With this arrangement, when the clutch is opened the engine can be rapidly stopped, thereby preventing the unnecessary use of fuel by the engine during vehicle deceleration, coasting, or idling. The interal combustion engine is rapidly restarted upon the closing of this clutch using the energy which is stored in the flywheel.

With regard to the incorporation of an electric motor into the operation of the vehicle flywheel, German Patent disclosure No. 2,400,760 shows the integration of the flywheel with an electric motor which also serves as the starting motor. The flywheel is integrated into a clutch located between the internal combustion engine and the mechanical transmission. The starting motor is constructed as a disc rotor motor, however according to the reference, the flywheel is positioned on the same side of the mechanical clutch as the internal combustion engine crankshaft so that it is not possible to operate the drive with the engine and the flywheel decoupled.

It is therefore an object of the present invention to provide a new and improved drive train system for hybrid operation of a motor vehicle in a manner which eliminates the need, and consequent inefficiency, of the hydrodynamic torque converter conventionally used with an automatic transmission.

SUMMARY OF THE INVENTION

In accordance with the present invention there is provided a vehicle drive train comprising an internal combustion engine having an output shaft, a flywheel, and a clutch for selectively connecting the flywheel to the engine output shaft. There is provided an automatic transmission connected to the flywheel for driving the vehicle and a starting motor for turning the flywheel.

In a preferred embodiment the starting motor and flywheel are integral parts of the clutch. The internal combustion engine may be controlled by an accelerator lever which is coupled to a position transducer that generates a transducer output signal for generating a shifting signal for controlling the transmission. The accelerator may include an accelerator switch responsive to the position of the accelerator lever to generate a disengaging signal for disengaging the clutch when the accelerator lever is not depressed. With this arrangement, the vehicle is allowed to coast with the internal combustion engine stopped when driving power is not demanded. There may also be provided a manually operated switch means for overriding the disengagement signal and thereby keeping the clutch engaged when the accelerator lever is released. There can also be provided a switch responsive to an operating condition of the engine such as engine temperature, for overriding the clutch disengagement signal.

In a preferred embodiment there can be provided a means for generating an engine speed signal and a control unit having a first input for the transducer output signal, a second input for the engine speed signal and an output for delivering a shifting signal to the transmission. The drive train can include an accelerator lever which has a plurality of ranges of accelerator lever positions each corresponding to one of the ordered gears of the transmission so that each of the gears corresponds directly to a range of the accelerator position. In this case the first gear of the transmission would correspond to form this depression of the accelerator lever.

The internal combustion engine can include an intake passage with the throttle valve position therein and there can be provided a storage means having an address input responsive to the engine speed signals. The storage means stores a plurality of throttle valve position control signals which correspond to a selected set of throttle valve positions greater than that required for traveling on level grounds and less than required for optimal fuel consumption for any given engine speed. An operating means is provided to respond to the throttle valve control signals and operate the throttle valve.

The arrangement of the drive train of the present invention allows the internal combustion engine to be completely stopped when power output from the engine is not required. In addition, the generally inefficient torque converter, usually associated with an automatic transmission, is eliminated by the provision of a starting motor, preferably electrical, which provides the initial movement of the vehicle when starting from a stopped condition. The starting motor turns the flywheel, and when the flywheel achieves a preselected rotational speed, for example, 1500 revolutions per minute, the clutch engages in order to turn and start the internal combustion engine which provides power for driving the vehicle at higher rotational speeds. In the preferred embodiment vehicle efficiency is further enhanced by control units which control not only the gear provided by the automatic transmission, according to the accelerator pedal position, but also provide a setting for the throttle which provides a high efficiency output of the internal combustion engine. The throttle setting of the internal combustion engine is maintained between the point of lowest fuel consumption and the point for constant speed operation. This results in the generation of excess power when traveling over flat terrain, which is generally consumed by rolling resistances, such as cornering, headwinds and upward gradients. If an undesirable increase in speed occurs because of the excess power, the driver can release the accelerator pedal, thereby causing the vehicle to coast freely until the desired speed is reached. On the other hand if the speed should drop below the desired value the driver can further depress the accelerator pedal. In either case a position sensor located on the accelerator pedal will deliver corresponding signals to the automatic transmission so that it can change gears appropriately.

For a better understanding of the present invention together with other and further objects reference is made to the following description taken in conjunction with the accompanying drawings, and its scope will be pointed out in appended claims.

BRIEF DESCRIPTION OF THE DRAWINGS

FIG. 1 is a schematic diagram of the engine, the transmission, and drive apparatus and associated control circuitry; and FIG. 2 is a plot of power versus speed for various parameters for an internal combustion engine.

DESCRIPTION OF THE PREFERRED EMBODIMENT

The internal combustion engine, automatic transmission, and the unit containing the starting motor, which is also known as a drive-up motor, clutch, and flywheel, are not shown nor described in detail since they are well known to those skilled in the art. For instance, the details of such a clutch unit and starting motor are disclosed in German Letters of Disclosure No. 24 00 760. In such a clutch unit, the flywheel mass is comprised of the mass of the rotor for the starting motor and the mass of the transmission-side clutch part, and the transmission-side clutch part includes the rotor for the starting motor. Solid state memories and comparators are also well known in the art and it is, therefore, not necessary to describe them in detail for the purpose of explaining this invention. The various parameters and values which are given are intended only as examples and may be varied as appropriate.

In FIG. 1, an internal combustion engine 1, which has an output shaft 24 and a throttle valve, is shown. The engine 1, a clutch unit 2, and an automatic transmission 4 are arranged along the line of the drive train. The output shaft 24 is connected to an engine-side clutch part 3. The clutch unit 2 selectively couples the engine to the transmission by engaging the engine-side clutch part 3 and the transmission-side clutch part 2'. The starting motor consists of a rotor 2'' and a stator 2'''. The transmission-side clutch part 2' is permanently connected with the rotor 2''. A flywheel consists of the mass of the rotor 2' plus the mass of the transmission-side clutch part 2'. Hereinafter, the reference numeral 2'' will be used to refer to the flywheel-rotor combination, and this combination will be referred to as merely a flywheel; however, when the word "flywheel" is used, the element mentioned is also to be considered as the rotor of the starting motor, unless the contrary is indicated. The automatic transmission 4 has an input shaft 25 and a servo pump 4', which is driven electrically and is connected to the drive wheels of the vehicle.

From the above description, it is already apparent that the drive apparatus does not contain the hydrodynamic torque converter commonly associated with an automatic transmission. Moreover, the flywheel as such, meaning just the flywheel and not the flywheel-rotor combination, which is generally part of the internal combustion engine, is arranged to the right of the clutch proper such that after disengagement of the clutch parts 2' and 3, the internal combustion engine 1 stops if the ignition or fuel delivery is discontinued. Initial acceleration of the vehicle is achieved using the starting motor, but after a predetermined rotational speed "nl" is achieved, clutch parts 2' and 3 are engaged to accelerate and start the internal combustion engine 1, practically without jerk. In the event that the driver of the vehicle should let the accelerator pedal return to its rest position, the clutch parts 2' and 3 will open, as will be described in greater detail below, so that the internal combustion engine stops while the automatic transmission 4 remains in a high gear corresponding to the vehicle's actual speed or rotational wheel speed.

In the embodiment shown, switching means are provided for maintaining the operation of the engine 1 even when a signal opening the clutch parts 2' and 3 is present. This is useful when the engine is cold, during downhill driving, when the engine is in danger of cooling-off, or for purposes of maintenance tests.

The operation of the drive apparatus will now be described in greater detail.

In FIG. 1, the main switch 5 is coupled with the ignition switch. An operating-mode selector switch controls the operation of the clutch and the engine. This switch has three positions, namely position E (electric), position M (motor), and position N (normal). When the operating-mode selector switch is in position M, only switch 6 is closed, when it is in position N, only switch 7 is closed, and when it is in position E, switches 6 and 7 are both open. Switch 8 closes below a predetermined temperature, which in actuality is the water temperature or the oil temperature, or both. Switch 9 closes when the engine is rotating and switch 10 closes when the flywheel rotational speed, "nl," is greater than a selected value, e.g. 1500 r.p.m. Switches 11 and 12 are closed when the accelerator pedal and brake pedal, respectively, are not in their rest positions. Finally, switch 13 changes position when "nl" is equal to 1800 r.p.m.

Each of the operating modes, E, M, and N, will now be discussed separately.

Operating mode E is initiated by closing switch 5. Switches 6 and 7 are both open in operating mode E. This enables the vehicle to be moved by purely electrical power through the actuation of switches 11 and 12. Switch 12 provides electric braking of the vehicle. In this mode and all others, the automatic transmission 4 operates as a function of the position of the accelerator pedal 14 and of the rotational speed "n" of the engine.

A switch 15, which is connected to the clutch unit 2, prevents the electric starting motor in the clutch 2 from running in reverse. When switch 15 is manually activated, the functions of switches 11 and 12 are exchanged, and in that situation, no forward movement of the vehicle will occur. The electric mode of operation is useful for traveling short distances where freedom from noise and exhaust gases is desired, such as in garages, pedestrian malls, and building projects. Braking in this phase is accomplished first by means of electric braking by the starting motor in the clutch 2 unit acting as a generator and then by means of the conventional braking system of the vehicle, which is not shown. The foregoing explanation of operating mode E is in single-step control. By successively alternating switches 11 and 12, thus alternating between acceleration and braking, multi-stage control may be achieved. The starting motor must have a torque that is the same magnitude as the maximum torque of the engine 1. Thus the power rating of the starting motor is approximately twice that of conventional starter motors.

Operating mode N, the normal mode, may be employed when the engine is either warm or cold, by closing switch 7. Initial movement of the vehicle is achieved electrically by closing switch 11, which occurs when the accelerator pedal 14 is depressed and which starts the starting motor that turns the flywheel 2" and turns the driving wheels (not shown) of the vehicle through the transmission 4. When the rotational speed "nl" of the flywheel exceeds a preselected speed, for example 1500 r.p.m., switch 10 closes. With switches 5, 7, 10, and 11 closed, a fuel-delivery signal is produced at point 22 and a clutch-engagement signal is produced at point 23. The clutch engages, the engine is rotated, fuel is supplied to the engine, and the engine starts. Should one of the switches 10 or 11 open momentarily, signifying a change in speed or some other parameter, a delay element 19 prevents the engine from immediately stopping. Where "nl" is greater than 1800 r.p.m., switch 13 will change position causing the starting motor to act as a generator and charge the battery 20 of the vehicle as necessary by way of regulator 21.

When the accelerator pedal 14 is released, the switch 11 opens and following a delay through delay element 19, the clutch parts 2 and 3 will also open. The engine will stop while the vehicle continues to roll freely. The engine will start again immediately when the accelerator pedal is depressed as long as the flywheel rotational speed exceeds 1500 r.p.m.

It is also possible to operate the engine in operating mode N when it is cold. The engine is started in the same manner which is described above as when it is warm. However, if the accelerator pedal 14 is released causing switch 11 to open, the engine will continue to operate, since a voltage signal is provided through a switch 8 while the engine is cold and switch 9 as long as the flywheel is moving. When the engine warms up, switch 8 will then open.

In operating mode M the engine is started in the same manner as for operating mode N. The engine will remain in operation as long as the flywheel is rotating and switch 9 is closed until the main switch 5 is opened. This mode is useful for keeping the engine engaged for engine braking while traveling down hills.

In addition to the above modes of operation, other variations are also possible. For instance, the reverse gear of the transmission may be eliminated, since reverse operation can be achieved by the operation of switch 15. Also, a switch (not shown) placed in parallel with the switch 6 may serve to charge the battery.

The automatic transmission 4 is controlled by the position of the accelerator pedal 14. A position signal indicator 16, such as a potentiometer, or a multiple position switch, is affixed to the accelerator pedal 14 mechanism, and will produce an analog signal representative of the position of the accelerator pedal 14. The entire range of the accelerator pedal 14 is divided into predetermined ranges according to engine speed "n". These ranges correspond to the various gears of the automatic transmission 4. For a given position of the accelerator 14, the position signal indicator 16 will present or transmit a value that falls within a given rotational speed range, which in turn corresponds to a particular gear. Depending on the actual rotational speed "n" of the engine, a comparator 17 which is connected to the position signal indicator 16, will transmit a shifting signal to the automatic transmission to shift either up or down.

The throttle valve of the engine 1 is varied as a function of the rotational speed "n" such that the engine 1 operates approximately within the range of least fuel consumption for that speed "n." At the same time, the operating point must provide enough power so that the vehicle can overcome the rolling resistance encountered on flat terrain.

FIG. 2 illustrates a power versus rotational speed diagram for an internal combustion engine. Curve "a" represents maximum power. Curve "b" indicates the minimum required power needed to overcome rolling resistance on flat terrain when the vehicle is in gear. Curve "c" is a plot of least fuel consumption versus speed. Finally, curve "d" represents an approximation of curves "a," "b," and "c." Curve "d" may be translated into corresponding positioning signals "DK" for controlling the position of the throttle valve of the engine as a function of the actual engine rotational speed "n." Memory 18 is provided as storage for these values.

Since curve "d" lies somewhat above curve "b," the vehicle will accelerate quite slowly when operated on flat terrain. It may be assumed that the excess power generated will be consumed by various rolling resistances such as curves, head winds, and inclines. If a vehicle is traveling too quickly, the driver may release the accelerator pedal 14 and have the vehicle roll freely until it obtains a desired speed. If the speed drops below the desired speed, the driver can accelerate. The transmission 4 will then shift downward, since the rotational speed "n" is below that required to maintain the same gear position.

The control of the transmission may also be designed in a manner where the gear selection is directly associated with the accelerator pedal position. In this arrangement, the transmission will remain in gear so long as the maximum rotational speed of the engine is not exceeded. Then, the accelerator pedal 14, in its fully depressed position, will correspond to the first gear as long as the maximum rotational speed of the engine is not exceeded. In the second gear, the cutoff might be chosen at 80 percent of full depression.

While there has been described what is believed to be the preferred embodiment of the invention, those skilled in the art will recognize that other and further modifications, may be made thereto without departing from the spirit of the invention, and it is intended to claim all such embodiments as fall within the true scope of the invention.

I claim:

1. A vehicle drive train, comprising an internal combustion engine having an output shaft, an automatic transmission having an input shaft, a drive-up motor of a noncombustion type being in torque-transmitting connection with said input shaft, a clutch between said output shaft and said drive-up motor having an engine-side part and a transmission-side part, a flywheel, and control means responsive to flywheel speed for controlling clutch engagement, said transmission being of the type automatically shifting between stages upon receiving shifting signals, said flywheel being permanently connected with said transmission-side clutch part, said flywheel, clutch and drive-up motor replacing a hydrodynamic torque converter, and said control means permitting engagement of said clutch only when an accelerator lever is actuated and flywheel speed is above a predetermined value.

2. A drive train means as set forth in claim 1, wherein said flywheel is an integral part of the transmission-side part of said clutch.

3. A drive train as set forth in claim 1, the improvement wherein said starting motor is an integral part of the transmission-side part of said clutch.

4. A drive train as set forth in claim 2 or 3, wherein a common accelerator lever is provided for said engine and said motor and is coupled to a position transducer that generates a transducer output signal for generation of a shifting signal for said transmission.

5. A drive train as set forth in claim 4, wherein an accelerator switch, responsive to the position of said accelerator lever generates a disengagement signal for disengaging said clutch when said accelerator lever is not depressed.

6. A drive train as set forth in claim 5, wherein there are provided switch means for overriding said disengagement signal.

7. A drive train as set forth in claim 5, wherein there are provided switch means responsive to the operating condition of said engine for overriding said disengagement signal.

8. A drive train as set forth in claim 4, wherein there is further provided a means for generating an engine speed signal and control unit having a first input for said transducer output signal, a second input for said engine speed signal, and an output for delivering a shifting signal to said transmission.

9. A drive train as set forth in claim 8, wherein said accelerator lever has a plurality of ranges of accelerator lever position and said transmission has a plurality of ordered gears, where each of said gears corresponds directly to one of said ranges of said accelerator position, and further wherein a first gear of said transmission corresponds to full depression of said accelerator lever.

10. A drive train as set forth in claim 4, wherein said internal combustion engine has an intake passage with a throttle valve positioned therein and wherein there is provided a storage means, having an address input means responsive to an engine speed signal, in which there are stored a plurality of throttle valve position control signals, where said signals correspond to a selected set of throttle valve positions greater than required for traveling on level ground and less than required for optimum fuel consumption for any given engine speed, and an operating means responsive to said throttle valve control signals for operating said throttle valve.

* * * * *